J. G. P. THOMAS.
TRANSMISSION OF POWER.
APPLICATION FILED AUG. 28, 1916.
1,341,223.
Patented May 25, 1920.
3 SHEETS—SHEET 1.
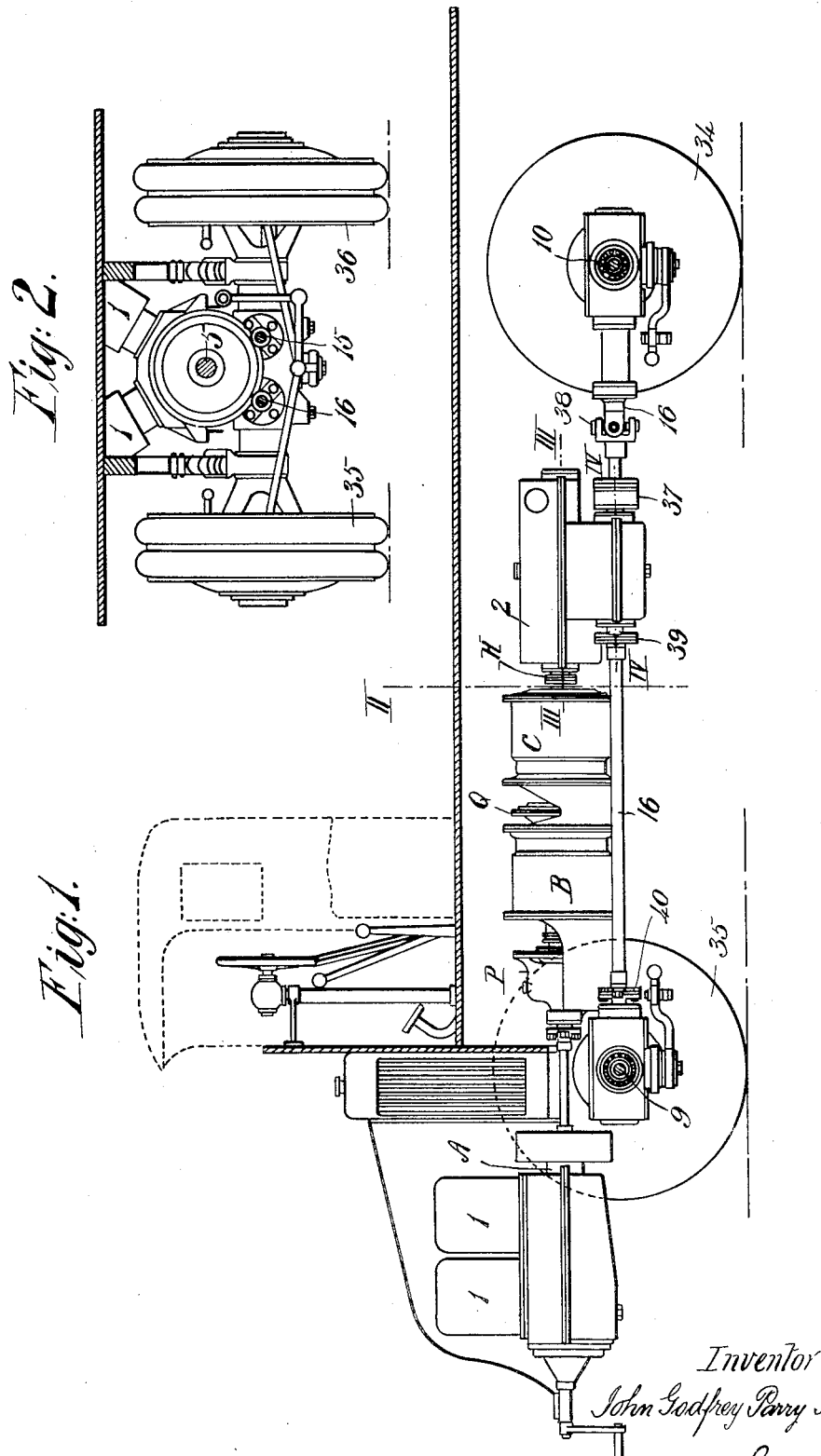

J. G. P. THOMAS.
TRANSMISSION OF POWER.
APPLICATION FILED AUG. 28, 1916.

1,341,223.

Patented May 25, 1920.

Inventor
John Godfrey Parry Thomas
per Herbert Sefton Jones
Attorney.

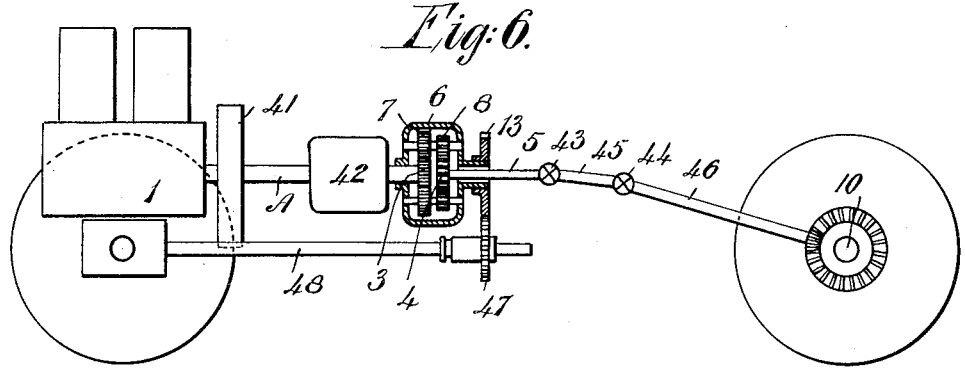
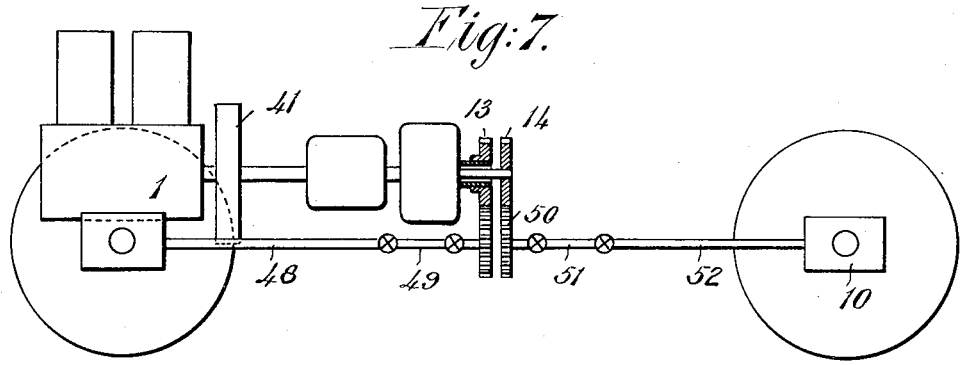
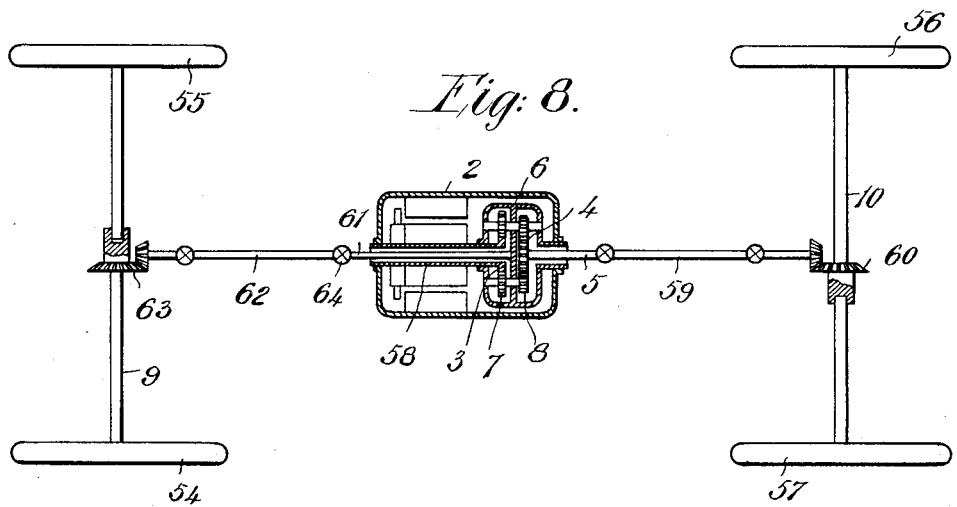

UNITED STATES PATENT OFFICE.

JOHN G. P. THOMAS, OF LONDON, ENGLAND, ASSIGNOR TO THE THOMAS FOREIGN PATENTS LIMITED, OF LONDON, ENGLAND.

TRANSMISSION OF POWER.

1,341,223.            Specification of Letters Patent.         Patented May 25, 1920.

Application filed August 28, 1916. Serial No. 117,355.

*To all whom it may concern:*

Be it known that I, JOHN GODFREY PARRY THOMAS, a subject of the King of Great Britain, residing at 14 Leonard Place, Kensington High street, in the county of London, England, have invented new and useful Improvements in the Transmission of Power, of which the following is a specification.

The present invention relates to gearing for the transmission of power, particularly designed for use in cases where a large reduction in gear ratio is desirable between the source of power and the driven member. The present invention is particularly concerned with gearing of the double epicyclic or planetary kind, such as that set forth in the specification of my United States Patent No. 948,436. In my earlier invention one member of the double gearing, for example, the smaller of two sun pinions was driven direct from the source of power; the planet carrier of the gearing was connected to the armature shaft of one dynamo electric machine, while the larger of the two sun pinions was in driving relation with a shaft carrying the armature of a second dynamo electric machine, and connected to the road wheels of the vehicle, without any mechanical relation between the two driving shafts, except through the gearing itself.

The object of the present invention is a gearing adaptable to instances in which there are two members to be driven at relative speeds determined by a mechanical connection between the driven members. As examples of such cases the driving of road and rail vehicles and ships may be cited. In the first case the axles or wheels of the vehicle which have to be driven separately have related speeds owing to the mechanical connection between them provided by the surface of the road or the rails upon which the vehicle is running. In the latter case the separately driven members are usually two propeller shafts, the speeds of which are related owing to the mechanical connection of the medium, to wit the water in which the propellers rotate.

According to the present invention then, one member of the double planetary gearing is driven directly or indirectly from the prime source. Each of the other two members of the gearing transmit power to two driven shafts or other members which are directly mechanically connected through the medium upon which the drive is exerted. These two driven members therefore, have normally the same speed.

More particularly defined the invention when applied to motor vehicles comprises a planetary gearing having one member driven by the engine and the other two members driving respectively a pair of parallel longitudinal shafts, usually the engine drives the smaller sun pinion while the planetary carrier, and the larger sun pinion drive the two shafts in order to obtain a considerable reduction in gear ratio. The two longitudinal shafts may according to the taste of the designer either drive the respective wheels of one axle or drive different axles. By this means in addition to the large reduction in gear ratio effected, the effect of an ordinary differential gearing is obtained. Further, according to the invention one of the longitudinal shafts can, if desired, be locked and the drive taken from the other at a larger gear ratio.

The invention further comprises the combinations of elements and parts more specifically herein claimed. Some embodiments of the present invention are illustrated in the accompanying drawings in which:—

Figure 1 shows a conventional side elevation of a vehicle equipped in accordance with the invention;

Fig. 2 is a cross section on the line II—II of Fig. 1;

Fig. 6 is a diagrammatic side elevation of a modification;

Fig. 7 is a similar view of a further modification; and

Fig. 8 is a diagrammatic plan partly in section of the invention applied to an electrically driven trailer.

Figure 3:
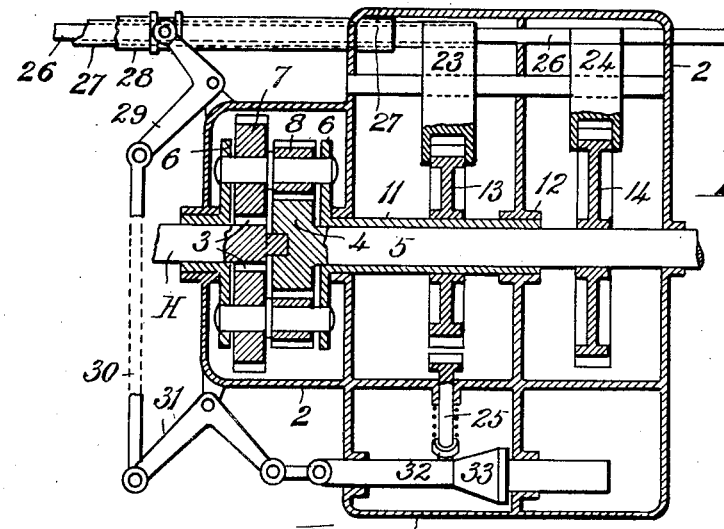
Fig. 3 is a horizontal section to an enlarged scale of the gear box upon the line III—III of Fig. 1.
Figure 4:
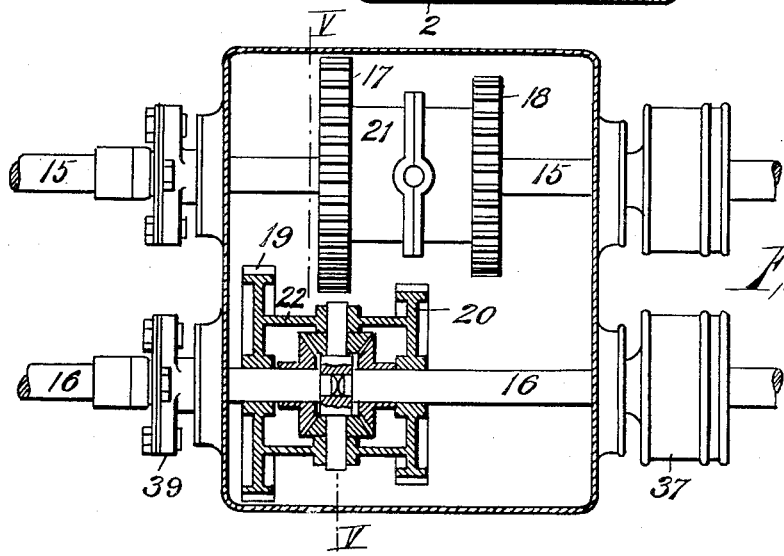
Fig. 4 is a similar view on the lower plane IV—IV of Fig. 1.
Figure 5:
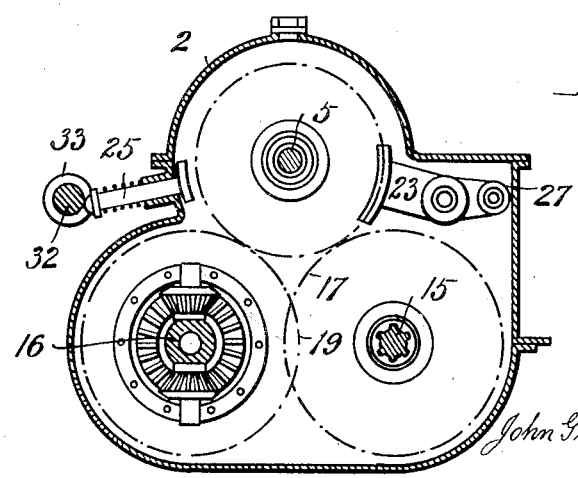
Fig. 5 is a cross section of the gear box upon the line V—V of Fig. 4.

Dealing first with Figs. 1 to 5 of these drawings, the engine 1 through its shaft A drives the casing of a double planetary or epicyclic train P as set forth in the specification of United States Patent No. 948436. Electrical machines B and C, and a clutch Q are provided exactly as described in the aforesaid specification. In the present case, however, the shaft H transmitting the drive passes into a gear box 2 and drives the small sun pinion 3 of a double epicyclic or planetary train, also of the kind described in the aforesaid prior specification. This train consists of three elements: the small sun pinion 3, the large sun pinion 4 co-axial therewith but on an independent shaft 5, and the planet carrier 6 which, in the example shown, carries a pair of sets of planet pinions 7, 8 respectively engaging with the two sun wheels 3 and 4. The planetary gearing is so mounted in the vehicle that the axes of the sun pinions 3 and 4 are longitudinal to the vehicle and at right angles to the driven axles 9 and 10. The carrier 6 of the planetary gearing is carried in bearings 11 in the gear box 2 and has a sleeve-like extension 12 extending toward the driven axle. This extension carries slidably a spur gear wheel 13. The large sun pinion 4 of the planetary gearing is mounted upon the shaft 5 which extends toward the rear axle 10 of the vehicle through the sleeve-like extension 12 of the carrier 6. A spur wheel 14 is also slidably mounted on the shaft 5 nearer to the rear axle 10 than the spur wheel 13 upon the extension 12.
As mentioned above, the whole of the gearing is carried in the casing or gear box 2. In the rear end of the casing, as best seen in Fig. 4, two longitudinal shafts 15, 16 projecting rearwardly are mounted, and pairs of spur wheels 17, 18, 19, 20 drive the outer casings 21, 22 of differential gearings arranged about each of the shafts 15, 16. The spur wheels 17 and 19 are made equal in size, and those 18 and 20 are also equal in size but smaller than the wheels 17 and 19. The shafts 15 and 16 are divided, as seen in Fig. 4, the two portions of each being connected by the differential gearings. The outer member or casing 21 of the differential gear on the shaft 15 is integral with the gear wheels 17 and 18, and similarly the outer casing 22 of the differential gearing about the shaft 16 is integral with the spur wheels 19 and 20 as mentioned above. The remainder of the differentials are as in known constructions, that is to say, the outer members 21 and 22 drive the central member or planet carrier, and the side members are each connected to one half of either the shaft 15 or the shaft 16.
The gears 17 and 19 are made of such a size as to mesh with the spur wheel 13 when the latter is slid into the correct position by means of the fork 23. Similarly the gears 18 and 20 are of such a size that either can gear with the spur wheel 14 when the latter is slid in the correct position by means of the fork 24. In addition to these movements the spur wheel 13 when in the mid position can be locked by means of a dog 25 for the purpose which will appear hereinafter. The control of the gear wheels 13 and 14 is in the hands of the driver and is transmitted through tubular members 26, 27, 28. The tube 26 moves the wheel 14 through the fork 24, the tube 27 acts similarly upon wheel 13, and the outer tube 28 operates through bell crank lever 29 connecting rod 30, bell crank lever 31, rod 32, to pull into operation or to push out a conical member 33 which operates upon the tail of dog 25 which is retracted by spring 34.
In one position of the gearing, therefore, spur wheel 13 engages with spur wheel 19, and spur wheel 14 engages with spur wheel 18. In the opposite position spur wheel 13 engages with spur wheel 17 and spur wheel 14 engages with spur wheel 20. When spur wheel 13 is in the mid position and is locked by the dog 25, spur wheel 14 can drive either the spur wheels 18 or 20.
Although in the drawings the shafts 15 and 16 are shown in a lower plane than the shaft 5, yet if desired these can all be in the same horizontal plane.
The rear ends of the longitudinal shafts 15 and 16 drive the rear wheels 34 of the vehicle, and the forward ends of the shafts 15, 16 drive the front wheels 35, 36 of the vehicle. In the rear lengths of the shafts, couplings 37 and Hooke joints 38 are preferably inserted, and in the forward ends of the shafts there may be two flexible couplings 39, 40. The actual connections between these shafts and the axles can be bevel gearing, or any other form of gearing.
The effect of the gearing described is as follows:
If the vehicle is running straight ahead the rotation of the sun pinion 3 by the engine causes the sun pinion 4 and the planet carrier 6 to rotate in opposite directions. Their speeds of rotation will be such that shafts 15, 16 are rotated at equal speeds in opposite directions.
If the front and rear wheels are of the same size the front and rear portions of shafts 15 and 16 will also be rotating at equal speeds.
If the vehicle turns to the right the left hand wheels will travel over a longer path than the right hand wheels and must therefore rotate faster. This they are enabled to do by the double planetary gearing, the large sun pinion and the planet carrier altering their relative speeds so that the wheels rotate at speeds proportional to the length of path on which they travel.
A precisely corresponding result occurs if the vehicle is driven around a curve to the left.
If the front and rear wheels need to rotate at different speeds in order to cover the same space of ground in a given time they are enabled to do so by the differential gearings which appear in Fig. 4. In addition to this effect, however, it is evident that the gear affords a very large reduction in speed between the engine shaft and the axles if it is properly designed. Such a gear is extremely suitable for a tractor vehicle which has to draw one or more trailers. In addition, it has the advantage that when the dog 25 engages spur wheel 13 being in mid-position, the carrier 6 of the gearing is held stationary, and therefore the gear ratio between the engine shaft H and the shaft 5 is decreased, which is a very suitable condition supposing that the trailers are detached from the tractor and the latter has to return alone, because under these conditions the speed of the tractor will be very much greater for a given engine speed than it would if the carrier were not held stationary.

The torque transmitted to the spur wheel 14 will always be greater than the torque transmitted to the spur wheel 13 by an amount equal to the torque transmitted to the sun wheel 3. It is, however, possible to cause the same torque to be transmitted to both shafts 15 and 16 by choosing the spur wheels 13 and 14 of the correct relative sizes, and this is shown in the drawings.

If only one axle of the vehicle has to be driven, for example the rear axle 10, the differentials 21 and 22 can be dispensed with, and the gear wheels 17 and 18, and 19 and 20, for example, can be direct upon the shafts 15 and 16, the forward extensions of which are dispensed with. In this case, the driving planetary gearing serves the same purpose as the ordinary differential gearing, which latter can be dispensed with.

The steering wheels of the vehicle can be driven in the manner set forth in the prior specification of my United States Patent No. 1,203,663 filed 25th September, 1914.

In Fig. 6 an arrangement is shown in which there is no electromechanical transmission system of the kind set forth in the specification of United States Patent No. 948,436. Here the engine 1 with the usual fly wheel 41 drives through a speed and reverse gear box 42 and then drives through a gear of the kind described in connection with Figs. 1 to 5. In this case, the shaft 5 is connected through universal joints 43 and 44 and Cardan shaft 45 to the shaft 46, which drives the rear axle 10 by means of bevel gearing. The front axle in this case is driven from the gear wheel 13, which drives a spur wheel 47 on the forwardly extending shaft 48. In this case, if desired, only one of the front wheels and only one of the rear wheels need be driven, but more usually the shafts 46 and 48 will drive differentials on the rear and front axles respectively. Fig. 7 shows a slight modification of the arrangement shown in Fig. 6.

The drive to the front axle is the same as before. A Cardan shaft 49, however, is illustrated. The rear axle in this case, however, is driven from the wheel 14 through spur wheel 50, Cardan shaft 51 and shaft 52.

Yet again, Fig. 8 shows the invention applied to an electrically driven trailer vehicle. The electric motor 53 serves as the source of power for driving the vehicle and may be one of a series of motors employed in an electromechanical transmission of the kind set out in the specifications of United States Patents Nos. 948436 and 968290. As shown in the drawing, of the front wheels, only the wheel 54 is driven, the wheel 55 being loose, and of the rear wheels, the wheel 56 i. e., that diagonally opposite the wheel 54, is driven, and the wheel 57 is loose. This is the diagonal form of drive which can be applied to the system described in British specifications No. 102987, and, if desired, a free wheel device can be employed as described in the latter specifications so that when no power is transmitted electrically the motors 53 on the trailers remain at rest. Conveniently the free-wheel device may be a magnetic clutch automatically released when the electric supply to the motor 53 is discontinued. It is preferably inserted between the shaft 61 and the universal joint 64 to avoid the necessity of the small sun pinion 3 revolving at a high speed when no electrical power is transmitted.

The remainder of the arrangement shown in Fig. 8 hardly needs description. The motor shaft 58 is hollow and drives the small sun pinion 3. The large sun pinion 4, the shaft 5, the casing 6, and the planet wheels 7 and 8 are arranged exactly as described above in connection with Fig. 1. The shaft 5 serves to drive the rear axle 10 through the Cardan shaft 59 and bevel gearing 60. In this instance, however, the drive from the casing 6 of the gearing is taken through the center of the hollow motor shaft 58 by means of a shaft 61, which itself drives the front axle 9 through Cardan shaft 62 and bevel gearing 63.

Any of the systems above described can be conveniently used for the propulsion of ships where it is advantageous to drive the two propellers at a slow speed from one prime mover. In this case, the propellers could be coupled direct to the longitudinal shafts, such as 15 and 16, and would rotate in opposite directions, and steering of the vessel could be effected by means of a brake applied to either propeller. The reverse could be obtained as described above. In order to enable the vessel to turn around slowly in a confined space, both the gear wheels upon the longitudinal shafts such as 15 and 16 could engage with the same driven spur wheel, for example 14, the other spur wheel such as 13 being held stationary; or they could both mesh with this latter wheel, while the wheel 14 could be held stationary. Suitable magnetic clutches could be interposed between the shafts such as 15 and 16 and their respective propellers.

The invention is equally applicable to the cases of a vehicle driven by a steam engine or by an electric motor, or in fact by any kind of prime mover which requires a large reduction gearing between itself and the axle of the vehicle. The invention may also have applications other than to the driving of road vehicles or ships, as it is particularly valuable in any case where a large reduction in the speed of a driven shaft is desirable.

What I claim is:

1. A mechanism for the transmission of power in a motor vehicle comprising in combination a differential gearing, means for supplying power to one member of said gearing, a driving connection between one running wheel of the vehicle and a second member of said gearing, and a second driving connection between a second running wheel of the vehicle and the remaining member of said gear, and means for disconnecting one of said driving connections and locking the member of said gearing connected to said driving connection.

2. Mechanism for the transmission of power in a motor road vehicle, consisting in the combination of an internal combustion engine mounted in said vehicle, a double epicylic gearing comprising a small sun pinion in driving connection with said engine and a large sun pinion and planet pinions deriving their motion from said small sun pinion, longitudinal shafts journaled in said vehicle and driven respectively from said large sun pinion and said planet pinions, and driving connections between the vehicle wheels on one side and one of said longitudinal shafts and between the vehicle wheels on the other side, and the other of said longitudinal shafts.

3. A mechanism for the transmission of power in a motor vehicle comprising a prime motor, a differential gearing comprising two co-axial members and a planetary member, one of the former being driven by said motor, loaded shafts in connection with said other two members so that the planetary member rotates backward, a gearing connection between each of said shafts and one running wheel of the vehicle dimensioned so that each of two said running wheels experiences the same torque.

4. A mechanism for the transmission of power in motor vehicles comprising an engine in the vehicle, a three membered gearing of the double epicylic type, one member of which is driven by said engine, a pair of longitudinal shafts journaled in said vehicle, disconnectible gearing between each of said longitudinal shafts and one of the two drive members of said epicylic gearing, means for holding one of said driving members stationary and driving connections between each of said longitudinal shafts and one of the vehicle wheels.

5. A mechanism for the transmission of power to an electrically driven trailing vehicle comprising an electric motor with a hollow armature shaft, a double epicyclic gearing, comprising a large sun pinion, a small sun pinion, and planet pinions, the smaller sun pinion being in driving connection with said hollow armature shaft, a pair of shafts extending forwardly and rearwardly and in driving connection with said large sun pinion and said planet pinions and driving connections between said shafts and the front and rear axles of the vehicle respectively.

6. In a motor driven vehicle, a prime motor, an epicyclic gearing having unequal co-axial members and a planetary member, the smaller of said co-axial members being driven by said prime motor, a pair of parallel longitudinal shafts each driving one of the rear wheels of the vehicle and one of the front wheels, a differential gearing located in each of said longitudinal shafts and spur gearing connecting the central members of said differential gearings respectively with the larger co-axial member and with the planetary member of said epicyclic gearing.

In testimony whereof I have signed my name to this specification.

J. G. P. THOMAS.

Witnesses:
W. A. HASELDEN,
L. E. HAYNES.